United States Patent
Zhao et al.

(10) Patent No.: US 8,075,714 B2
(45) Date of Patent: Dec. 13, 2011

(54) LOCALIZED INDUCTION HEATING FOR RESIDUAL STRESS OPTIMIZATION

(75) Inventors: Pingshun Zhao, Peoria, IL (US); Howard W. Ludewig, Groveland, IL (US); Tao Hong, Peoria, IL (US); Fernando Martinez Diez, Peoria, IL (US); Michael Lynn Johnson, Lacon, IL (US); Kandarp Siddharthbai Patel, Dunlap, IL (US); Zhaolin Hu, Dunlap, IL (US); Steven R. Thompson, Benson, IL (US)

(73) Assignee: Caterpillar Inc., Peoria, IL (US)

( * ) Notice: Subject to any disclaimer, the term of this patent is extended or adjusted under 35 U.S.C. 154(b) by 695 days.

(21) Appl. No.: 12/017,993

(22) Filed: Jan. 22, 2008

(65) Prior Publication Data

US 2009/0183804 A1    Jul. 23, 2009

(51) Int. Cl.
*C21D 6/00* (2006.01)
*C21D 9/00* (2006.01)
*C21D 1/42* (2006.01)
*C21D 1/62* (2006.01)

(52) U.S. Cl. .................. 148/567; 148/660; 148/320

(58) Field of Classification Search .......... 148/567, 148/660, 320
See application file for complete search history.

(56) References Cited

U.S. PATENT DOCUMENTS

| | | | |
|---|---|---|---|
| 2,599,229 A * | 6/1952 | Bukaty | 219/653 |
| 4,188,419 A | 2/1980 | Detert et al. | |
| 4,354,883 A | 10/1982 | Terasaki | |
| 4,418,258 A | 11/1983 | McNealy et al. | |
| 4,505,763 A | 3/1985 | Sugihara et al. | |
| 4,590,346 A | 5/1986 | Sugihara et al. | |
| 4,687,894 A | 8/1987 | Koga et al. | |
| 4,694,131 A | 9/1987 | Ino et al. | |
| 4,772,336 A | 9/1988 | Enomoto et al. | |
| 4,939,042 A | 7/1990 | Thuse | |
| 5,013,370 A | 5/1991 | Diaz | |
| 5,587,098 A | 12/1996 | Matsen et al. | |
| 5,862,194 A * | 1/1999 | Fujieda et al. | 376/260 |
| 6,884,975 B2 | 4/2005 | Matsen et al. | |
| 6,884,976 B2 | 4/2005 | Matsen et al. | |
| 7,232,053 B2 * | 6/2007 | McCrink | 228/262.41 |

FOREIGN PATENT DOCUMENTS

JP            63310920 A  * 12/1988

OTHER PUBLICATIONS

Abstract of JP 63310920 A (Dec. 1988).*

* cited by examiner

*Primary Examiner* — Jie Yang
(74) *Attorney, Agent, or Firm* — Leydig, Voit & Mayer

(57) ABSTRACT

An apparatus for the heat-treating of a heat-hardenable steel cruciform article having a weld seam includes a heating element to heat the weld seam to a point that an austenitic transformation occurs, and a quenching chamber to cool the weld seam, causing the formation of Martensite and an associated expansion. The quenching is rapid since slow quenching may allow a crystalline phase other than martensite to form. The apparatus may comprise rollers operable to convey the welded cruciform article through the apparatus at a speed such that the weld seam is subjected to heating for a predetermined heat time sufficient to cause a formation of martensite there within, and such that the heated portion reaches the quenching chamber and is quenched to create a substantial amount of martensite, e.g., an amount sufficient to cause expansion of the part.

9 Claims, 6 Drawing Sheets

LOCALIZED INDUCTION HEATING FOR RESIDUAL STRESS OPTIMIZATION

TECHNICAL FIELD

This patent disclosure relates generally to welding of metals and, more particularly to introducing beneficial stresses in metal weld joints.

BACKGROUND

Metals have many favorable properties, a primary advantage being their strength and resilience compared to other materials. However, metals are not as easily formed as many other materials, and in particular, while it is relatively straightforward to form sheets, plates, rods, and other symmetrical shapes, it is difficult to form shapes that are more complex. Thus, it is often necessary to join one or more pieces of stock metal to form a finalized product of an irregular shape. Of the available methods, welding provides the best compromise of efficiency and strength for joining most metals, especially steel. However, the welding process typically leaves unwanted stresses within the final part, increasing the risk of a later failure of the part. For critical load-bearing pieces such as machine frames, beams, levers, and arms, the risk of failure should be minimized, both to avoid costly repair as well as to safeguard operators, nearby personnel and critical processes.

In the past, it was known to heat treat metal to eliminate stresses, with the hopes that the stress-free metal would more easily resist cracking and breaking after a period of use. For example, U.S. Pat. No. 4,418,258 entitled "Method for Heat Treating Metal," which recognized a need to relieve stress in microstructure welds, employed a heat treatment procedure for low alloy steel by induction heating in a second post-weld heat treatment. In particular, electrical induction heating, which is monitored, e.g., using a radiation pyrometer, is briefly applied to the area to be stress relieved in a post-weld heat treatment at a temperature approaching the critical point of the material. However, while this technique may reduce residual tensile stresses, it does not utilize the geometry or phase change of the material to induce beneficial stresses.

This background section is presented as a convenience to the reader who may not be of skill in this art. However, it will be appreciated that this section is too brief to attempt to accurately and completely survey the prior art. The preceding background description is a simplified narrative and is not intended to replace the reference being discussed. Therefore, interested readers should refer directly to U.S. Pat. No. 4,418,258 instead of relying upon the foregoing simplified narrative. Moreover, the resolution of deficiencies, noted or otherwise, of the prior art is not a critical or essential limitation of the disclosed principles.

SUMMARY

The disclosure pertains generally to a method of stress treating a cruciform article to permanently expand a selected volume of the cruciform article including at least a portion of a longitudinal weld joint. In an embodiment, the expansion is executed by expanding a crystalline structure of the steel within the selected volume by first heating the volume to a final temperature greater than the austenitic temperature of the steel. After heating, the compressive stress is created within the selected volume by quenching the steel to a temperature below its austenitic temperature. This imparts a short-range compressive stress in the selected volume, e.g., via the formation of martensite and local plasticity. In some cases, quenching via mass effect is employed instead of use of an external quenching medium.

In an aspect of the disclosure, an apparatus for the heat treating of a longitudinal welded cruciform article is described. The cruciform article is made of heat-hardenable steel and has a primary axis and a weld seam substantially parallel to the primary axis. In this embodiment, the apparatus includes a support for supporting the welded cruciform article, a heating element to heat a portion of the weld seam past the austenitic temperature, and a quenching chamber to cool the weld seam so as to fix the portion of the weld seam in an expanded state, thereby causing a residual compressive stress in the welded cruciform article.

In a further aspect, the disclosure pertains to a heat-treated steel cruciform article comprising first a second steel plates joined by a steel weld seam, wherein the steel weld seam contains residual compressive stress.

DETAILED DESCRIPTION

This disclosure relates to heat-treating a cruciform article to leave a residual compressive stress in the cruciform article. The stress is induced via the formation of martensite crystals having a greater volume per weight than the steel they replace. The method is well-suited for operation on low carbon low alloy steel, but other heat-hardenable steels may be used as well. In an embodiment, inductive heating applied by an inductive coil is used to heat the cruciform article. In this embodiment, the inductive coil may be water-cooled to avoid damage. One aspect involves conveying the cruciform article past the inductive coil while holding the inductive coil stationary while an alternative aspect involves conveying the inductive coil past the cruciform article while holding the article stationary. Quenching the steel may include applying a quench of water and/or steam to the heated cruciform article. Alternatively, the mass effect may be used in place of an external quenching medium.

In conjunction with the method, an apparatus for the described heat treating is described. In an embodiment, the apparatus includes one or more rollers for supporting the welded cruciform article, operable in a further embodiment to convey the welded cruciform article through the apparatus. In one aspect, the welded cruciform article is conveyed through the apparatus at a speed such that the portion of the weld seam is subjected to heating for a predetermined heat time sufficient to cause a formation of austenite (to be quenched to form martensite) within the portion of the weld seam, and such that the portion of the weld seam thus heated reaches the quenching chamber and is quenched to ensure the formation of martensite. In some cases, quenching via mass effect is employed instead of use of an external quenching medium.

In conjunction with the described method and apparatus, a heat-treated steel cruciform article is described. The cruciform article includes first and second steel plates joined by a steel weld seam having residual compressive stress therein. In an embodiment, the weld seam comprises an amount of martensite substantially greater than that of annealed steel of the same type and substantially greater than that of the first and second steel plates, e.g., sufficient to increase the local volume and induce compressive stress.

Figure 1:
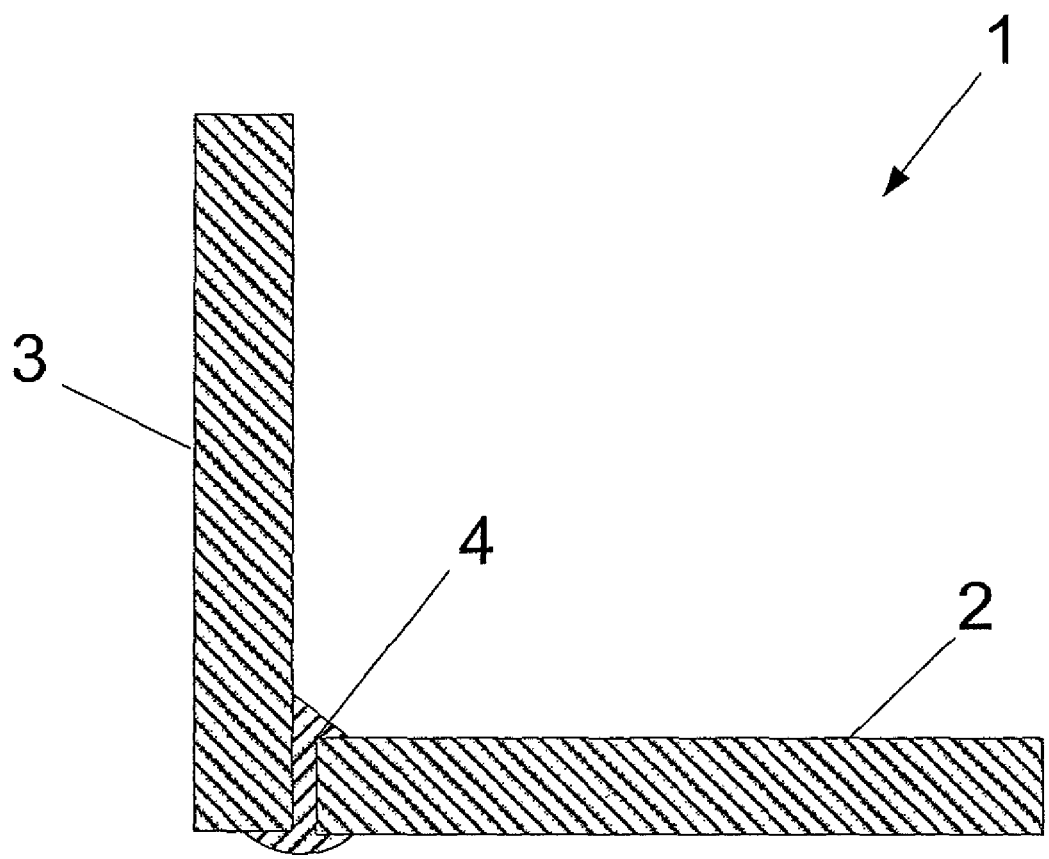
FIG. 1 is a cross-sectional end view of a welded cruciform article usable within the disclosed principles.

An exemplary welded cruciform article is shown in FIG. 1. The illustrated cruciform article 1 is composed of a first plate 2 welded to a second plate 3 via a weld 4. The weld 4 is shown as distinct from the plates 2, 3, for clarity; however, it will be appreciated that the material of the weld 4 may be difficult to delineate from the material of the plates 2, 3, in the finished cruciform article 1 other than by known location. The weld 4 may be made by any of a number of suitable methods as will be appreciated by those of skill in the art. For example, the weld 4 may be formed via arc welding, electron beam welding, laser welding, thermit welding, torch welding, MIG welding, TIG welding, etc. While the treatment process and apparatus described herein are applicable to any suitable heat-hardening steel, a specific example of a suitable material is low carbon low alloy steel.

Although the weld 4 serves to join the plates 2, 3 in a very rigid manner, the process of forming the weld involves the localized application of a substantial amount of heat energy, since the weld creation process requires temperatures sufficient to melt either the base metal or a filler metal. As such, when the weld 4 cools to ambient temperature after the weld 4 is formed, the material of the weld 4 undergoes simple thermal contraction as well as phase-induced contraction, resulting in residual tensile stresses in the material. These stresses tend to pre-stress the cruciform article 1 in the direction in which it will be further stressed during its useful lifetime, effectively decreasing the amount of additional stress that the part can withstand.

Figure 2:
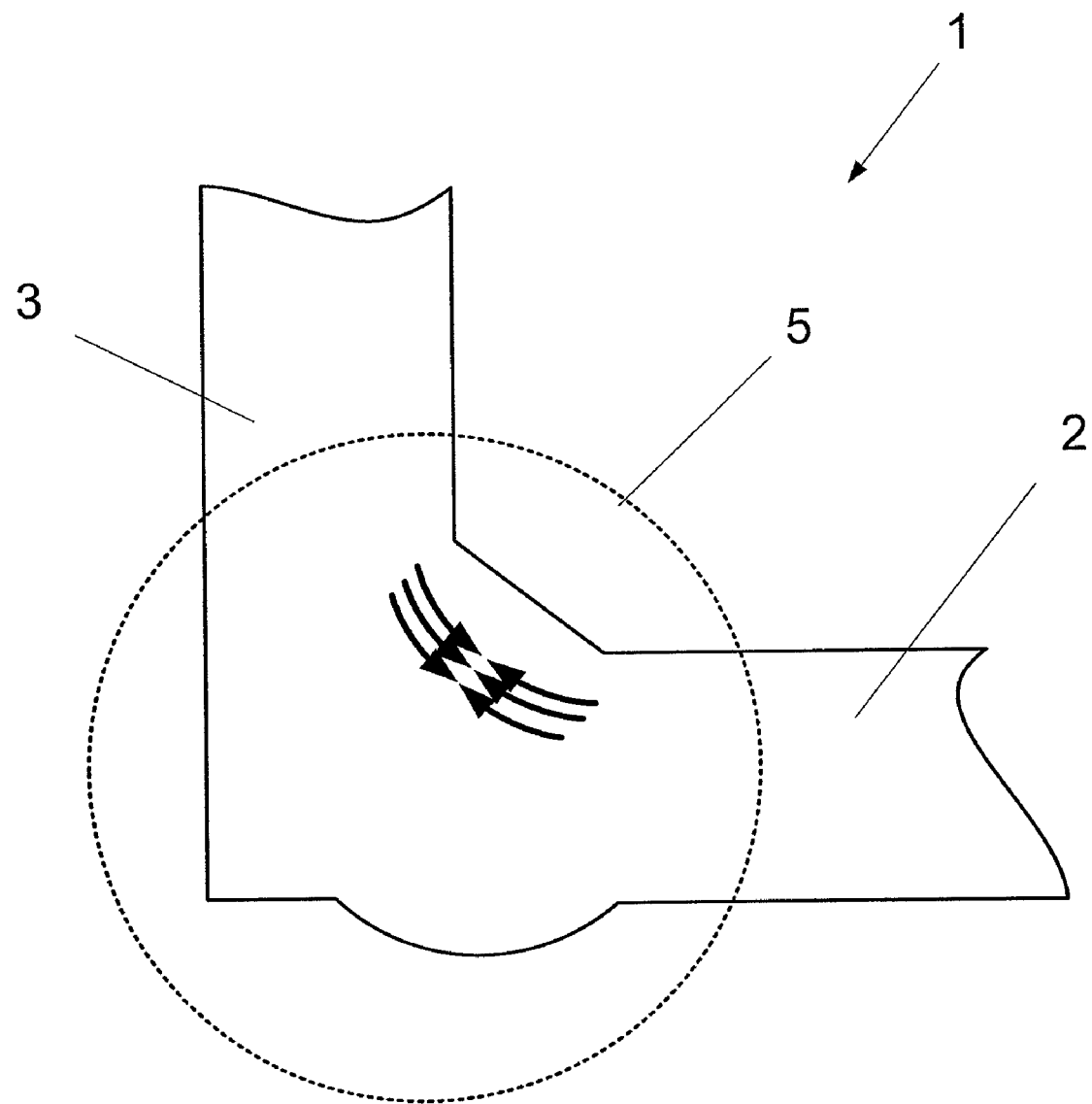
FIG. 2 is a schematic end view of the welded cruciform article of FIG. 1, showing the residual tensile stress pursuant to weld creation.

FIG. 2 is a stress diagram for the cruciform article 1, showing typical lines and directions of residual stresses in the weld 4. The selected area 5 including the weld 4 and nearby material of the plates 2, 3, is denoted by a circle. As can be seen the tensile stress in the cruciform article 1 tends to pull the weld 4 away from the plates 2, 3. Thus, as the cruciform article 1 is used, the stresses pulling the weld apart supplement the existing tensile stresses, causing premature failure of the weld 4.

Figure 3:
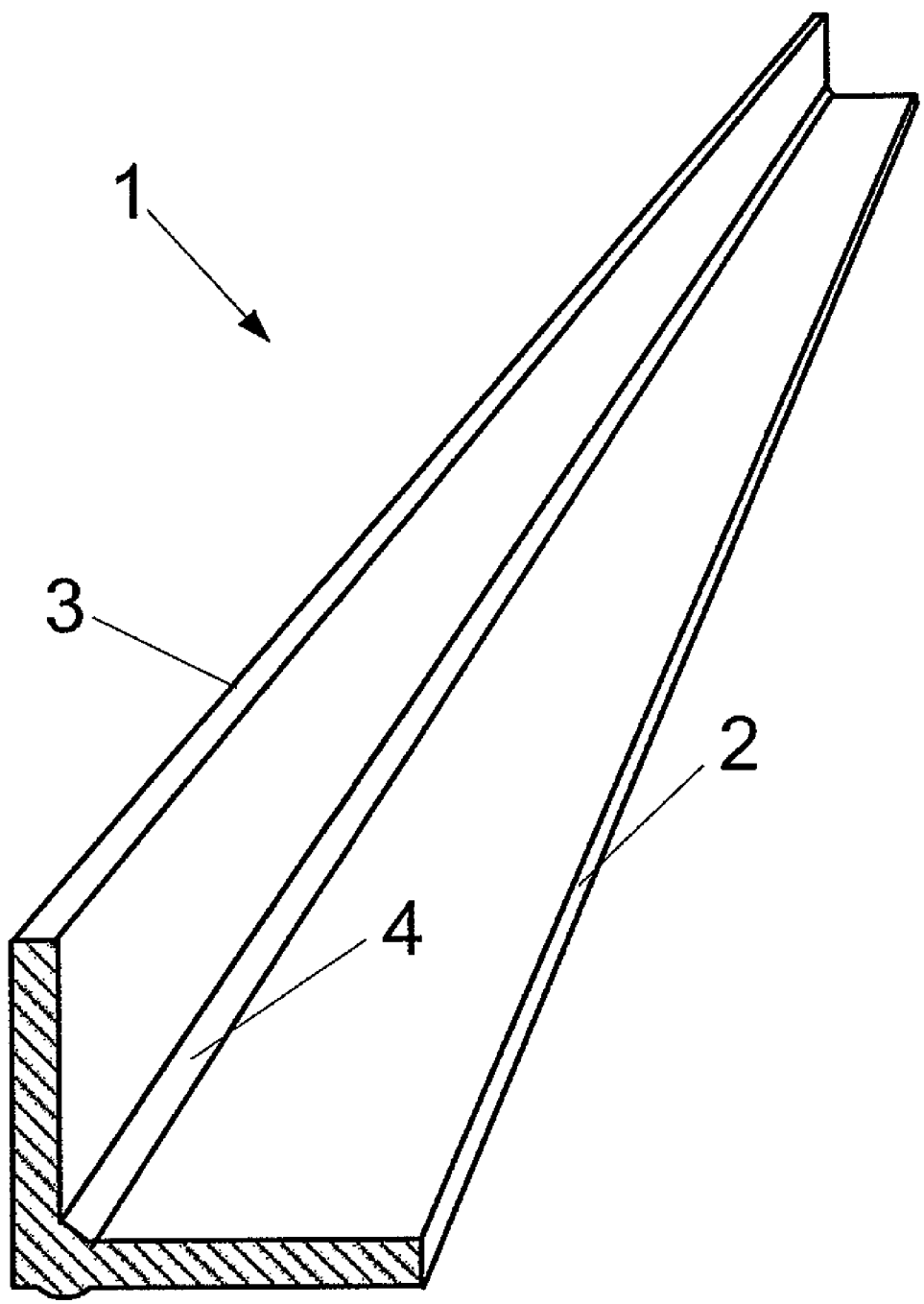
FIG. 3 is a perspective end view of a welded cruciform article usable within the disclosed principles.

FIG. 3 is a perspective view of the cruciform article 1 showing the weld 4 joining the elongated plates 2, 3 to form a cruciform article 1. Generally, a cruciform article 1 such as that shown can be expected to be used in a manner that applies flexing forces about the long axis of the cruciform article 1. While the plate 2, 3 that is lying in the flex plane may lack rigidity in this direction, the complementary plate 3, 2 is on edge to the plane of flex and thus secures the cruciform article 1 against the load. In this application, the weld 4 undergoes both shearing and tensile stresses, making the existing residual stresses of significance. It will be appreciated that other orientations of the cruciform article 1 may distribute the load more or less evenly between the plates 2, 3, but that the problems associated with residual tensile stress remain.

Figure 4:
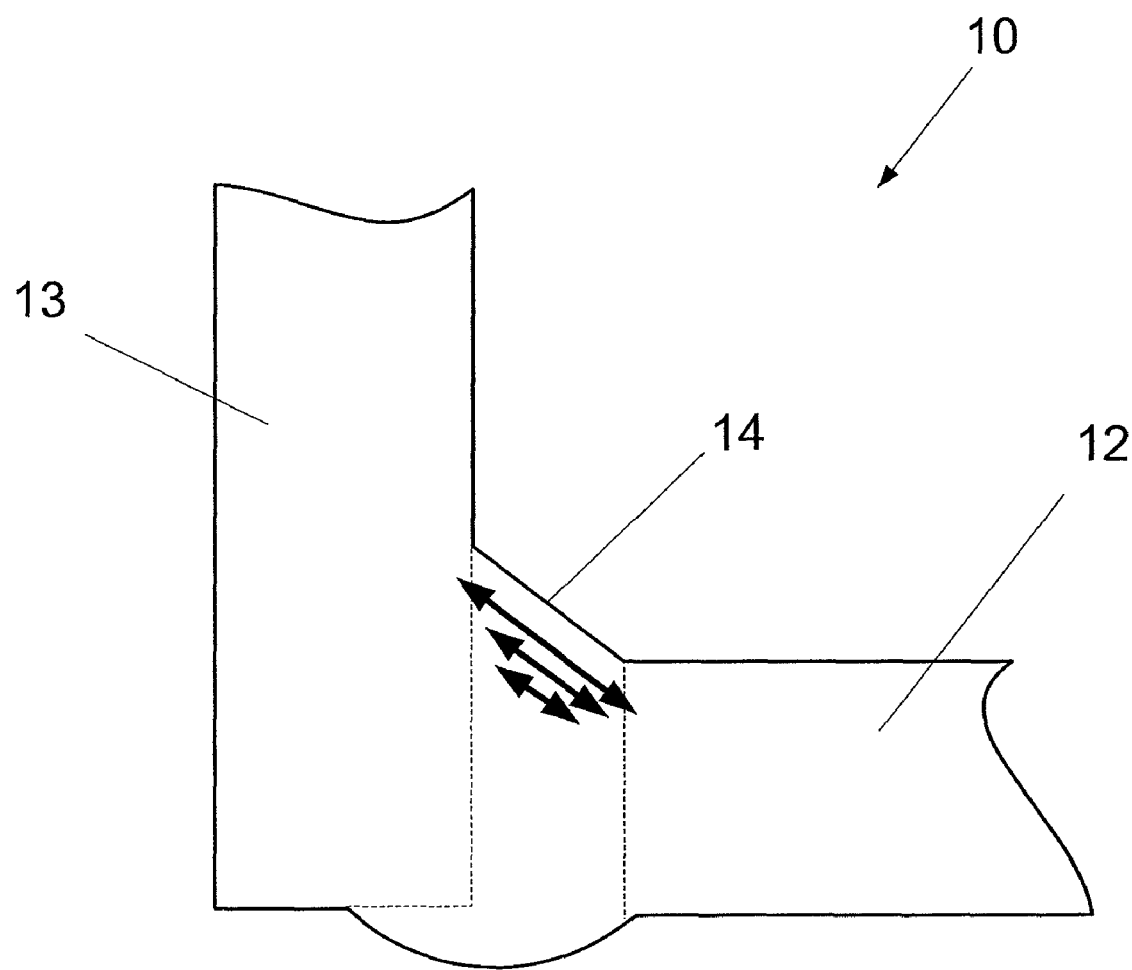
FIG. 4 is a schematic end view of a welded cruciform article showing residual compressive stress pursuant to the use of the disclosed principles.

In an embodiment of the disclosed principles, a welded part such as the cruciform article 1 undergoes an alternative or supplemental heat treatment to induce stresses into the part to support rather than pull apart the weld. A welded part 10, similar to the cruciform article 1 as illustrated in FIGS. 1-3, is shown in FIG. 4. The part 10 embodied internal tensile stresses at the weld 14 in the same manner as that shown in FIG. 3 after the creation of the weld 14, but was treated according to the disclosed principles to imbue the part 10 with compressive stresses that push the weld 14 against the plates 12, 13. In this manner, any added tensile stress during use of the part 10 must first overcome the residual compressive stress before exerting a pulling force on the weld 14. Thus, the part 10 has a higher load-bearing capacity and the weld 14 will withstand greater applied tensile stress.

Figure 5:
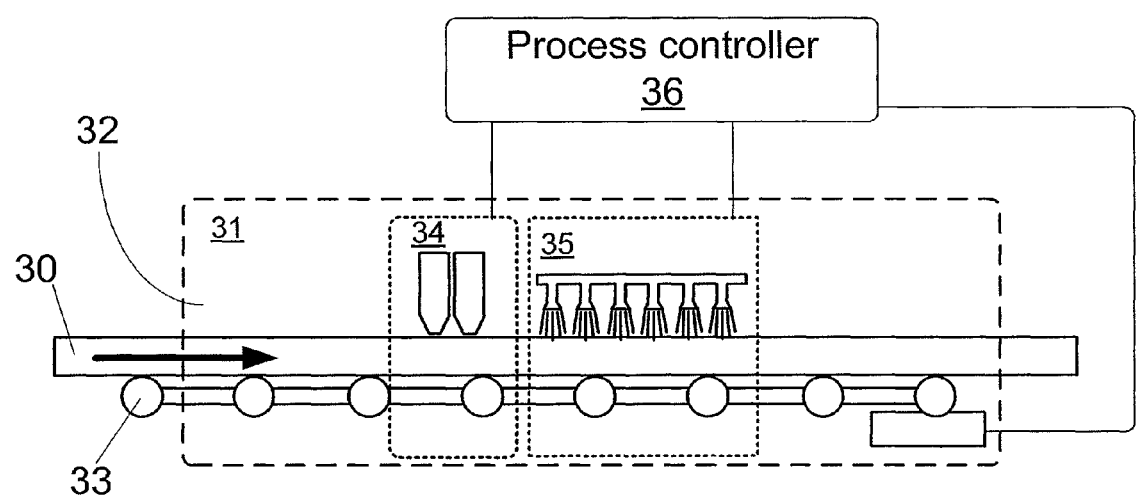
FIG. 5 is a schematic side view of a heat treatment apparatus according to the disclosed principles.

An apparatus for applying an appropriate heat treatment to induce the desired compressive stresses is shown schematically in FIG. 5. A welded part 30 such as an I-beam or cruciform article is fed into the apparatus 31 at an opening or port 32. The operation of the apparatus 31 is controlled by a process controller 36 that may be microprocessor driven. In this embodiment, the controller 36 operates via the execution therein of computer-executable instructions stored on a computer-readable medium such as RAM, ROM, removable or fixed, volatile or permanent memory storage media.

One or more rollers 33 or other conveyance means (e.g., conveyor belt, walkers, etc.) support the part 30 and optionally move the part 30 into the apparatus 31. One or more induction coils 34 within the apparatus 31 are situated so that the path of the part 30 within the apparatus 31 forces the part 30 into close but not contacting proximity to the one or more induction coils 34. The one or more induction coils 34 may be water cooled to dissipate waste heat generated in the one or more induction coils 34 during the induction process.

The part 30 is passed near enough to the one or more induction coils 34 to allow inductive coupling, while avoiding physical contact that could cause mechanical or electrical damage to the one or more induction coils 34 and/or supporting power and other systems. As the part 30 continues on the path through the apparatus 31, it next passes through a quench chamber 35. In the quench chamber, a quench of a fluid bath, spray, or steam is applied to the heated part. The quench medium may be a steam, bath, or spray of water, or may be oil, air, or other fluid or gas. Finally, the treated part 30 exits the apparatus 31 at the right side of the illustrated view. Although the apparatus 31 as illustrated in FIG. 5 holds the one or more induction coils 34 and quench chamber 35 stationary while the part 30 traverses the treatment area, it is also possible to traverse the one or more induction coils 34 and quench chamber 35 or other quench facility over the part 30 while the part 30 remains stationary. Moreover, if the area being treated is small, both the inductor and part may remain stationary instead of scanning. It will also be appreciated that with parts having substantial mass, the mass cooling effect may be used instead of an external quench medium.

Figure 6:
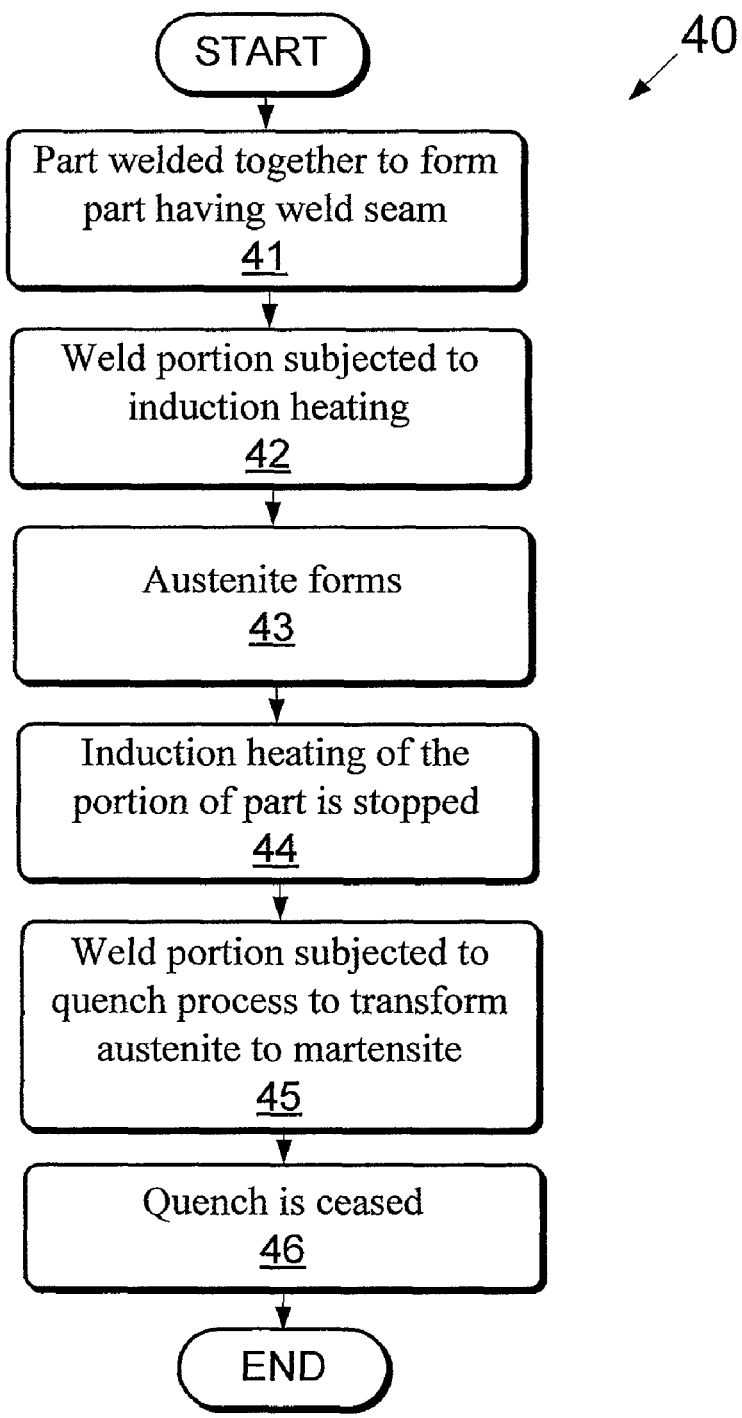
FIG. 6 is a flow chart showing a process of executing a heat treatment process according to the disclosed principles.

The flow chart of FIG. 6 illustrates an exemplary process 40 for heat-treating a weld according to one embodiment of the disclosed principles. It will be appreciated that although the process 40 is shown as employing a number of specific steps in a specific order, some steps may be omitted or reordered in other embodiments without departing from the disclosed principles.

At stage 41, the process, a part is welded together to form a part having a weld seam. The weld seam will be heat treated in stages 42-46. It will be appreciated that the following stages may be executed in a simultaneous and continual manner on sequential portions of a part as shown in FIG. 5. At stage 42, a weld portion is subjected to induction heating. When the temperature of the weld portion has exceeded the austenitic temperature of the weld material for a predetermined period T, austenite crystals will have formed within the weld material. The induction heating of the portion of the part is stopped at stage 44 and the part is subjected to a quench process in stage 45. The purpose of the quench process is to ensure that martensite, rather than another phase, is formed from the austenite, expanding the volume of the weld over its original volume. When the temperature of the part has decreased to within a suitable window, e.g., 200 C, of a final temperature, e.g., room temperature, the quench is ceased at stage 46 and the heat treating of the portion is finished.

Although a number of predetermined temperatures and periods are mentioned in the discussion of the process 40 of FIG. 6, it will be appreciated that the measurement of times and temperatures may be accomplished beforehand, so that there are no measurements taken during the actual heat treating process. For example, the required dwell times may be embodied in the speed with which the part moves past the induction coils and optionally the power of the coil, as well as the intensity of the quench. Thus, for example, a more rapid part traverse will result in a lower dwell time at elevated temperature as well as lower allowed quench time. This may require, for example, more intense quenching to reach the appropriate temperature in the shorter amount of time.

INDUSTRIAL APPLICABILITY

The present disclosure is applicable to the creation of structurally sound steel cruciform articles and other steel articles having a weld joint therein. Typically, a weld joint and the immediately surrounding material are susceptible to failure, e.g., cracking, when subject to repeated or excessive loads, especially in demanding industrial environments. For example, structural steel beams are used as load bearing components in many industrial machines such as bulldozers, dump trucks, cranes, tractors, shovels, graders, and the like. These problems of fatigue and failure are exacerbated by the residual tensile (pulling) stresses that are created in and around the weld seams of such beams during the welding process.

Although it is known to reduce these stresses, the subsequent application of a load to the beam immediately reintroduces similar stresses. The treated cruciform articles disclosed herein have a residual compressive stress that must first be overcome by an applied load before tensile stresses begin to form in the weld. In this manner, the treated cruciform articles have greater fatigue and yield resistance, allowing for fewer costly repairs and replacements.

It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

We claim:

1. A method of stress treating a steel cruciform article by rapidly and permanently expanding a selected volume of the cruciform article relative to a portion of the article surrounding the selected volume, the selected volume including at least a portion of a longitudinal weld joint under tensile stress, the method comprising:

providing the weld steel cruciform article having the selected volume under tensile stress due to the weld;

heating the selected volume to a final temperature greater than the austenitic temperature of the steel to cause the formation of austenite in the selected volume;

when the selected volume is at a temperature greater than the austenitic temperature of the steel, quenching the steel of the selected volume to a temperature below its austenitic temperature, wherein the quenching is executed at a speed causing a formation of martensite from the austenite, avoiding the formation of other phases, thus introducing a compressive force into the selected volume due to expansion of the material of the selected volume, and thus relieving the tensile stress.

2. The method according to claim 1, wherein the martensite replaces an amount of the steel and has a greater volume per weight than the steel it replaces.

3. The method according to claim 1, wherein the cruciform article comprises a heat-hardenable steel.

4. The method according to claim 1, wherein heating the volume to a final temperature includes heating the volume via inductive heating applied by an inductive coil.

5. The method according to claim 4, wherein the inductive coil is water-cooled.

6. The method according to claim 4, wherein heating the volume via inductive heating applied by an inductive coil comprises conveying the cruciform article past the inductive coil while holding the inductive coil stationary.

7. The method according to claim 4, wherein heating the volume via inductive heating applied by an inductive coil comprises conveying the inductive coil past the cruciform article while holding the cruciform article stationary.

8. The method according to claim 1, wherein quenching the steel of the selected volume includes applying one of water, mist and steam to the selected volume.

9. The method according to claim 1, wherein quenching the steel of the selected volume includes employing a mass effect quench.

* * * * *